United States Patent [19]

Bankier et al.

[11] Patent Number: 5,044,453
[45] Date of Patent: Sep. 3, 1991

[54] WEIGHING INSTRUMENT HAVING INTERCHANGEABLE SLIDES CARRYING GRADUATED SCALES

[75] Inventors: Jack D. Bankier, Northbrook, Ill.; Kenneth J. Muderlak, Shorewood, Wis.

[73] Assignee: Pelouze Scale Co., Evanston, Ill.

[21] Appl. No.: 893,652

[22] Filed: Aug. 6, 1986

[51] Int. Cl.$^5$ .............................................. G01G 19/40
[52] U.S. Cl. .................................... 177/25.16; 177/34
[58] Field of Search ................................... 177/31-44, 177/245, 25; 116/DIG. 37

[56]  References Cited

U.S. PATENT DOCUMENTS

| 806,499 | 12/1905 | Ritter | 177/31 |
| 2,750,917 | 6/1956 | Milligan | 116/DIG. 37 |
| 3,228,488 | 1/1966 | Coppola | 177/41 X |
| 4,280,574 | 7/1981 | Terraillon | 177/41 |

Primary Examiner—George H. Miller, Jr.
Attorney, Agent, or Firm—Leydig, Voit & Mayer

[57] ABSTRACT

A weighing instrument for the analysis of the weight-related characteristics of different materials has a pointer rotated about an axis in response to the weight of the material and which indicates a selected characteristic of the material on a selected graduated scale carried by an interchangeable slide. In the preferred embodiment, the weighing instrument is part of a diet control system also including an organized set of interchangeable slides each of which carries a number of concentric scales graduated in calories for respective food or drink items in a related food group. To facilitate handling of the slides, the slides are rigid and rectangular, and the weighing instrument has a rectangular slot for receiving and holding the slides under the force of their own weight. The pointer is protected by being carried on a circular disc and being covered by a viewing window which also serves to define the rectangular slot for receiving the slides. The slides are conveniently arranged in a horizontal stack which may be indexed according to major food groups. The slides in the stack are readily identified by generic names imprinted on the top edge faces of the slides.

20 Claims, 4 Drawing Sheets

WEIGHING INSTRUMENT HAVING INTERCHANGEABLE SLIDES CARRYING GRADUATED SCALES

BACKGROUND OF THE INVENTION

Field of the Invention

The present invention relates to weighing instruments of the kind having a number of graduated scales for indicating weight related characteristics of selected materials such as the caloric content of selected food items.

As it is well known, it is often necessary to determine the caloric content of various kinds and quantities of common food items, either for regular dieting to maintain good health and fitness, or for following a rigid diet established by a physician for the treatment of an illness or deficiency. Special diets may also require the determination of other weight-related characteristics of foods, such as the content of protein, fat, carbohydrates, and minerals such as calcium, phosphorous, iron, and sodium. Diabetics, for example, must pay particular attention to their intake of carbohydrates (glucides).

The basic method of determining a weight related characteristic of an unknown quantity of a food item is to weigh the food item, refer to a table or listing of foods to obtain the characteristic for a unit weight of the particular kind of food item, and multiply the unit weight characteristic by the weight of the food item. The unit weight characteristics of food items have been determined by the U.S. Department of Agriculture, and compilations have been published by numerous authors, including C.F. Adams, *Encyclopedia of Food and Nutrition*, Drake Publishers, Inc., New York, N.Y. (1977), and B.L. Gelb, *The Dictionary of Food*, Paddington Press Ltd., New York, N.Y. (1978).

It has been recognized that the steps of referring to the table of food characteristics and multiplying by the unit weight characteristic could be avoided by weighing the food item on a scale having a number of graduated scales, each of which corresponds to a different food item. Due to the limited number of graduated scales that can be handled, however, it has been necessary to associate each graduated scale with a number of food items. A small number of graduated scales can be used, each corresponding to a different unit weight characteristic, but then a table or listing is needed for referencing each food item to a particular one of the graduated scales.

Another known method of reducing the number of graduated scales is to provide a single respective scale for each of a plurality of food groups. This method assumes, however, that the unit weight characteristics of the foods in each group are not substantially different, which is not always true.

In German utility model No. 73 42204, a weighing instrument is described whose double pointer is moved in front of a fixed scale expressed in weight and behind a flexible transparent card slideable in horizontal slideways which give it the shape of a cylindrical sector. This card carries successive graduated scales which relate to different categories of foods and which are expressed in calories. Such a card is vulnerable since it slips out of the slide at its two ends and it is thus exposed to shocks, which risk damaging it and/or causing it to pass inadvertently from one category of foods to another, as well as to splashes of materials which are liable to soil it. In addition, the horizontal dimensions of the card are necessarily restricted, which limits the maximum number of categories of foods to a low figure.

In U.S. Pat. No. 4,119,162 a weighing instrument is described having a pointer rotating coaxially with respect to a flat annular dial whose angular position is adjustable by the user and which is divided into four sectors. One of these sectors extends over an angle of 180° and is graduated only by weight. Each of the three other sectors extends over an angle of 60° and comprises three or four concentric scales whose external graduation is expressed in weight and of which each of the other graduations is expressed in calories for one category of foodstuffs. The scales are labelled merely by letters A-H, which could cause confusion when reading the scales since a table is required for associating the food groups with the letters. A known alternative is to place the names of representative food items next to their associated scales, but this further limits the space available for the scales.

In U.S. Pat. No. 4,223,750 a weighing instrument is described having a scroll carrying a large number of scales calibrated for groups of foods having similar characteristics and labeled by the names of representative food items in each group. To select the scale for a desired food item, the operator must turn the scrolls, by hand or by operating an electric motor, until the scale for the food item comes into view.

SUMMARY OF THE INVENTION

In view of the above, the primary object of the present invention is to provide a weighing instrument having a large number of graduated scales corresponding to various materials or weight-related characteristics, but which does not require a good deal of time and effort for selecting the scales for a desired material or weight related characteristic.

Another object of the invention is to provide a weighing instrument for the evaluation of selected weight-related characteristics of various foodstuffs wherein graduated scales are arranged in food categories, but without limiting the accuracy of the result.

Yet another object of the invention is to provide a weighing instrument having a large number of graduated scales for the evaluation of selected weight-related characteristics of various foodstuffs wherein it is difficult for the user to inadvertently read an incorrect scale for a selected food item and characteristic.

A specific object of the present invention is to provide an improved diet control system for enabling a person to limit more effectively his or her total daily intake of calories or carbohydrates to a specific amount.

Briefly, in accordance with the primary aspect of the invention, a large number of graduated scales are provided on a set of interchangeable slides. The weighing instrument is provided with means for receiving and holding a selected slide in a predetermined position and orientation with respect to a weight-responsive pointer and so that the pointer and graduated scale are both visible.

To facilitate the interchange of the slide and the reading of the scale and pointer, the weighing instrument is of the kind having the pointer rotated about an axis in response to weight and the slide is flat when it is received and held for viewing in relation with the pointer. Preferably the slide is rigid, transparent, rectangular, and includes a number of concentric arcuate or circular scales. To protect the pointer, preferably the pointer is mounted on a circular disc concentric with the axis of pivoting of the pointer, and the selected slide is inserted from above and held by the force of gravity between the circular disc and a transparent planar window.

To facilitate the selection of the slide for a desired material or weight-related characteristic, the slides include scales corresponding to related groups of materials or characteristics. The graduated scales on each card are preferably color coded along with a description of the material or weight-related characteristic to prevent confusion among the scales. Moreover, to increase the number of scales, more than one scale may be provided at the same circumference.

In accordance with the preferred embodiment of the invention, a diet control system further includes an index file of slides arranged by food groups. For control of caloric intake, the slides preferably do not have a corresponding scale graduated in weight so as to prevent cheating. (A special slide, however, could be provided with a scale graduated in weight or weight-related units that are not associated with food, such as postage rates.) To facilitate the analysis of food compositions, the weighing instrument is provided with a wide-range zero-adjusting knob so that the pointer may be zeroed to a different graduated scale prior to the successive addition of a different ingredient to a mixing bowl placed on the weighing instrument.

BRIEF DESCRIPTION OF THE DRAWINGS

Other objects and advantages of the present invention will become apparent upon reading the following detailed description and upon reference to the drawings in which.

While the invention has been described in connection with certain preferred embodiments, it will be understood that it is not intended to limit the invention to the embodiments shown but, on the contrary, the intention is to cover the various alternative and equivalent constructions included within the spirit and scope of the appended claims.

DESCRIPTION OF THE PREFERRED EMBODIMENTS

Figure 1:
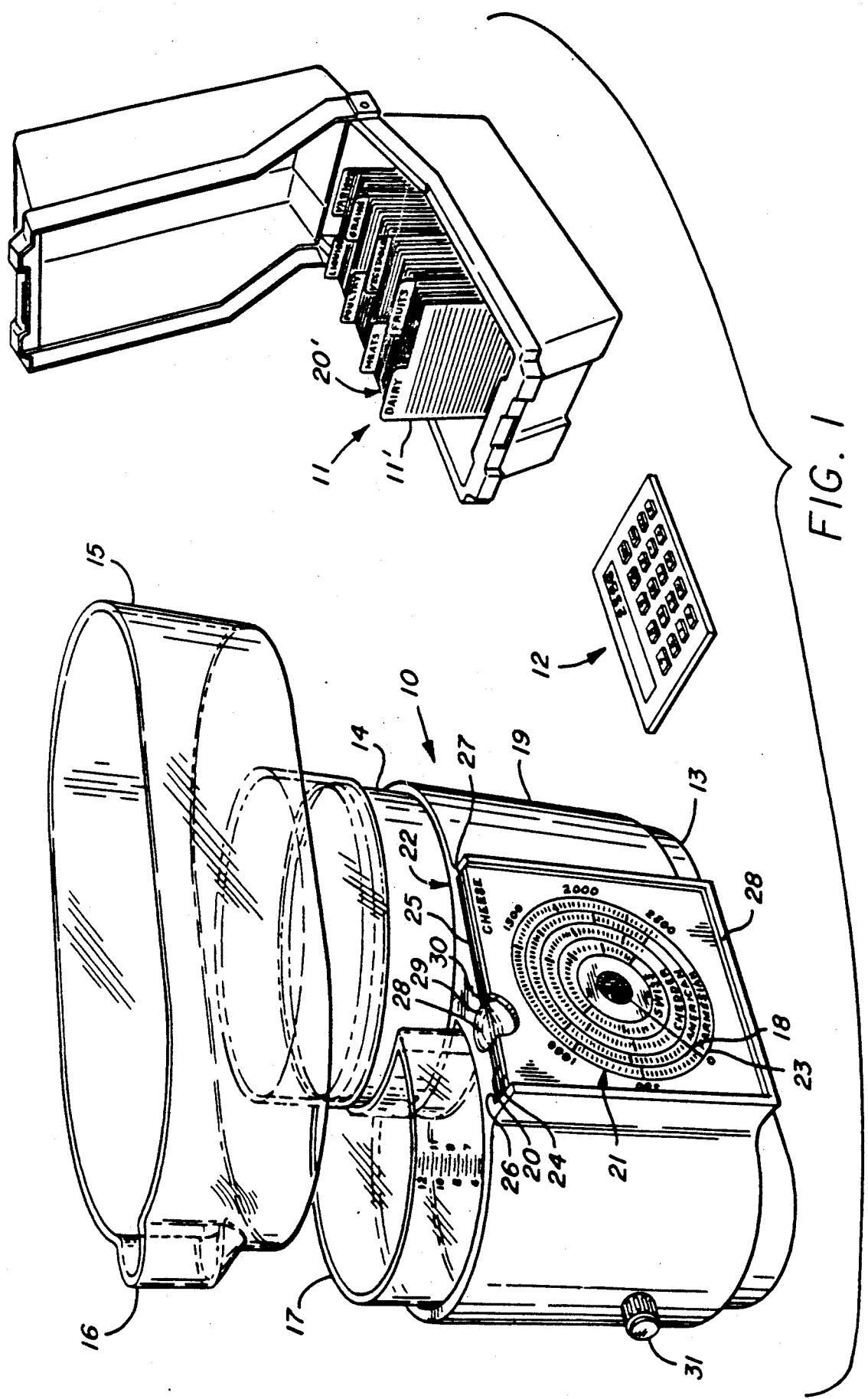
FIG. 1 is a perspective view of a diet control system according to a preferred embodiment of the present invention.

Turning now to FIG. 1, there is shown the components of a diet control system according to a preferred embodiment of the present invention. The diet control system includes a weighing instrument generally designated 10, an index file generally designated 11 of slides arranged according to food groups, and a conventional liquid crystal display (LCD) pocket calculator generally designated 12.

The weighing instrument 10 includes a base 13, and a weighing platform 14 that is vertically movable with respect to the base 13. Material such as food items to be weighed (not shown) are placed on the platform 14. To facilitate the weighing of liquid or powdered items, a mixing bowl 15 having a pour spout 16 is adapted to be placed on the weighing platform 14. For weighing somewhat smaller quantities of material, a graduated cup 17 is also provided which can be alternatively placed on the weighing platform 14.

Figure 4:
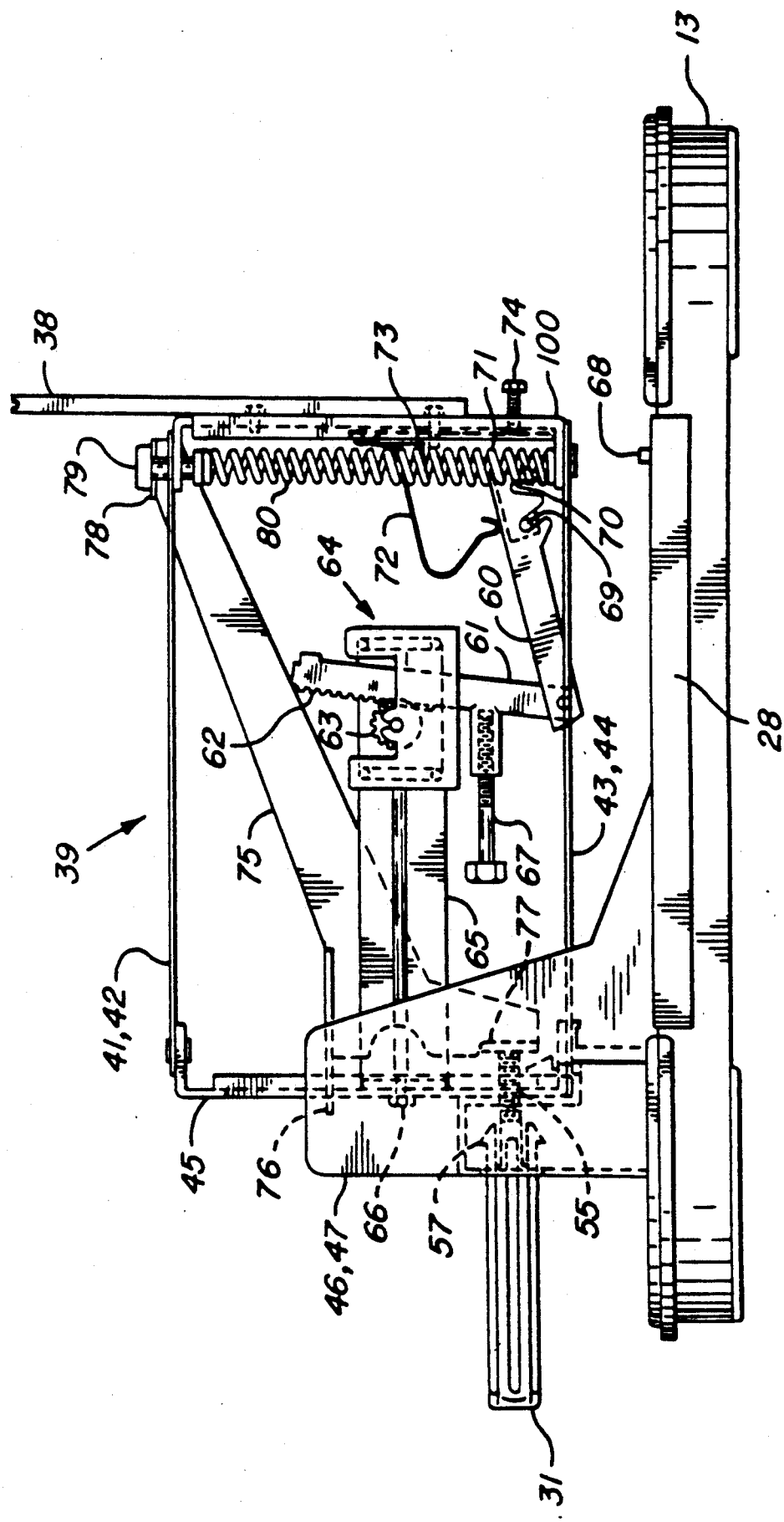
FIG. 4 is an elevation view of the mechanical weighing mechanism used in the weighing instrument of FIG. 1.

As is conventional, the weight placed on the platform 14 is indicated by the movement of a pointer 18. A mechanical mechanism, shown and further described below in connection with FIG. 4, is enclosed in a housing 19 and displaces the pointer 18 in proportion to the weight placed on the weighing platform 14.

In accordance with a primary aspect of the invention, the pointer 18 cooperates with an interchangeable slide 20 carrying one or more graduated scales generally designated 21 calibrated in weight-related units such as calories. The weighing instrument 10 is provided with means generally designated 22 for receiving and holding a selected slide in a predetermined position and orientation with respect to the pointer 18 and so that the pointer 18 and graduated scales 21 are visible at the same time.

To facilitate the interchange of the slide 20 and the reading of the scales 21 and the pointer 18, the weighing instrument 10 is of the kind having the pointer 18 rotated about an axis in response to the weight placed on the platform 14, and the slide 20 is flat when it is received and held for viewing in relation with the pointer 18. As shown in FIG. 1, for example, the graduated scales 21 are a series of concentric circles or arcs about the pivot axis of the pointer. The pointer 18, therefore, moves in a first plane perpendicular to the pivot axis and the graduated scales 21 lie in a second plane parallel to and closely spaced from the first plane. Preferably the slide 20 is fairly rigid, transparent and rectangular.

To protect the pointer 18, preferably the pointer is mounted on a circular disc 23 (more clearly shown in FIG. 2) concentric with the pivot axis of the pointer 18, and the selected slide is inserted from above and held by the force of gravity between the circular disc 23 and a transparent planar window 24. Specifically, the slide 20 is inserted into a rectangular slot defined by the window 24, a back plate 25, and side planes 26 and 27 defined by the housing 19. The inserted slide 20 is held by the force of gravity on a bottom ledge 28 which is integral with the base 13. To facilitate the insertion and removal of the slide 20, the housing 19 has a spherical depression 28 aligned with semicircular indentations 29 and 30 in the back plate 26 and the transparent window 24, respectively. The depression 28 and indentations 29 and 30 guide the operator's fingers to an upper edge portion of the slide 20 held in means for holding and receiving.

To facilitate the analysis of food compositions, the weighing instrument 10 is provided with a wide-ranged zero-adjusting knob 31 so that the pointer 18 may be zeroed to a different graduated scale 21 prior to the successive addition of a different ingredient to a mixing bowl 15 placed on the weighing platform 14. The zero-adjusting knob 31 preferably can effect at least a full 360° rotation of the pointer 18, so that the pointer 18 can be moved from any angular position on the graduated scale 21 to the zero position. In practice, the individual weighing and analysis of different food items added to the bowl 15 is performed by successively (1) inserting in the weighing instrument a slide corresponding to the material to be analyzed, (2) adjusting the zeroing knob 31 to register the pointer 18 with the zero indication for a scale carried by the inserted slide, and (3) placing the material to be analyzed (not shown) in the mixing bowl 15, so that the pointer 18 indicated the calories or other weight-related units of the added material.

The index file 11 preferably includes a large number of slides 20 arranged by food groups behind labelled dividers 11. As shown, the food groups included dairy products, fruits, meats (exclusive of poultry), vegetables, poultry, grains, liquids, and various other items. For control of calorie intake, the slides preferably do not have a corresponding scale graduated in weight so as to prevent cheating. A special slide, however, could be provided with a scale graduated in weight or weight-related units that are not associated with food (such as postage rates).

For recording and remembering the calories consumed during the day, a conventional LCD pocket calculator 12 keeps a running total of the calories indicated by the weighing instrument 10 over the course of the day.

Figure 2:
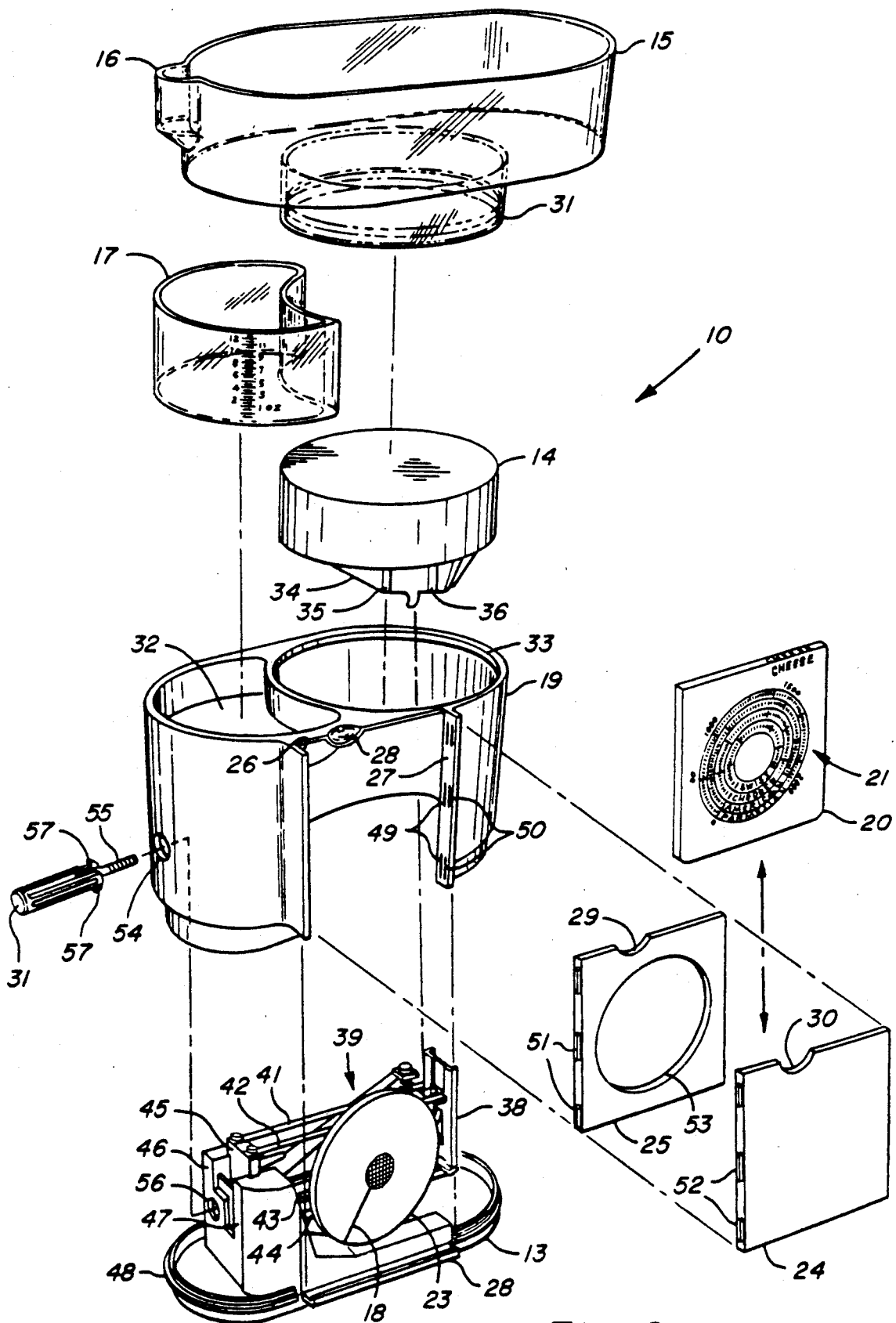
FIG. 2 is an assembly drawing in perspective showing the components of the weighing instrument of FIG. 1.

Turning now to FIG. 2, there are shown in the assembly diagram the various parts of the weighing instrument 10. The mixing bowl 15, which is molded from transparent plastic, has a pedestal 31 which rests upon and slightly covers the top portion of the weighing platform 14. Similarly, the measuring cup 17 is molded from transparent plastic and rests in a complementary depression 32 formed in the top left portion of the housing 19.

Figure 3:
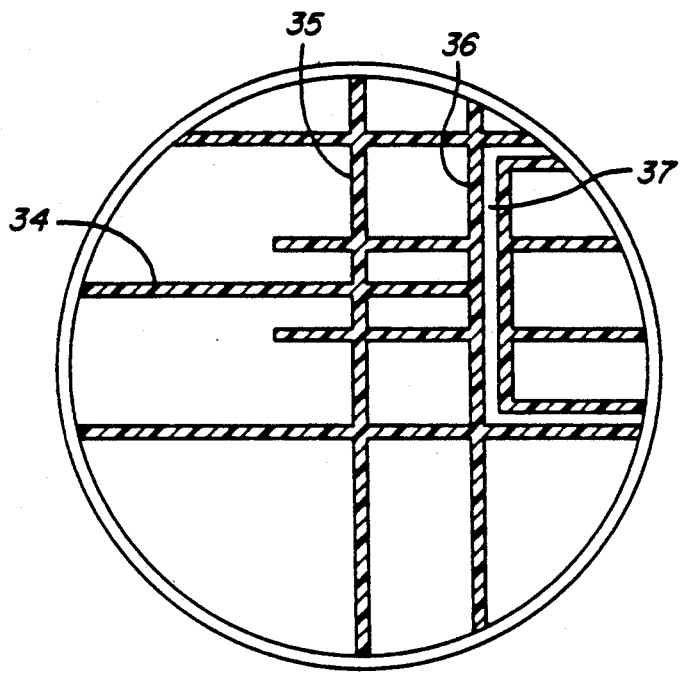
FIG. 3 is a bottom view showing the ribbing of the weighing platform.

The weighing platform 14 is injection molded from opaque plastic and is received through a circular aperture 33 in the top right portion of the housing 19. The weighing platform 14 has a set of reinforcing ribs such as ribs 34, 35, and 36 which form a C-shaped channel 37 shown in FIG. 3. The channel 37 snugly receives the end portion of a complementary rail 38 (FIG. 2) which forms part of the vertically moving portion of a mechanical spring-balance mechanism generally designated 39.

The spring balance mechanism includes four parallel leaf springs 41, 42, 43 and 44 which bridge the vertically moving rail 38 to a stationary rail 45. The stationary rail 45 is snugly received between two supports 46 and 47 which are integral with the base 13.

During assembly, the housing 19 is placed over the mechanical mechanism 39 and the lower portion of the housing 19 engages with a rim 48 formed on the upper periphery of the base 13. After the housing 19 and base 13 are engaged, the rim 48 is ultrasonically welded to the bottom portion of the housing 19, it being understood that both the housing and base are injection molded from thermoplastic. The weighing platform 14 is merely press fitted onto the upper portion of the rail 38.

For assembly of the back plate 25 and the transparent window 34, the side planes 26 and 27 of the housing 19 include sets of depressions 49, 50 which mate with corresponding protrusions 51, 52 formed on the left and right sides of the back plate 25 and transparent window 24. It should be evident that once the housing 19 is mounted on the base 13, the back plate 25 is inserted between the side planes 26 and 27 so that the disc 23 carrying the pointer 18 is received within a corresponding circular aperture 53 formed in the back plate 25. The transparent window 24 is then inserted so as to cover the disc 23 and back plate 25. By applying a moderate level of force so as to bow the transparent window 24, the window can be removed and reassembled for cleaning purposes.

Finally, the zero-adjusting knob 31 is inserted through a circular hole 54 in the lower left of the housing 19. At its inner end the adjusting knob 31 includes a threaded shaft 55 which engages with a hole 56 leading to the mechanical mechanism 39. In order to prevent the zeroing knob 31 from becoming unscrewed and detached from the weighing instrument 10, a number of retaining tabs 57 are provided on the outer circumference of the knob 31 proximate to the threaded shaft 54.

Turning now to FIG. 4, there is shown an elevation view of the mechanical weighing mechanism 39. This conventional weighing mechanism is manufactured by Terraillon, BP 501 Annemasse, Cedex, France 74103, and has been successfully used for a number of years in the Terraillon two kilogram scale model number BA22. The parallel leaf springs 41, 42, 43, 44 form a parallelogram in conjunction with the moving rail 38 and fixed rail 45 which insures that the moving rail 38 moves in a vertical direction. Due to the resiliency of the parallel leaf springs, the vertical deflection of the rail 38 is proportional to the weight applied to the rail 38.

To indicate the amount of vertical deflection, the rail 38 is connected by a pivoting lower arm 60 which is in turn pivoted to a linear rack 61 which includes gear teeth 62 meshing with a pinon 63. The pinon 63 is journalled in a box generally designated 64 which is supported by a horizontal beam 65 secured by a screw 66 to the stationary rail 45. Therefore, the pinion 63 is angularly displaced by an amount proportional to the vertical displacement of the rail 38 and thus the applied weight. To eliminate lash between the teeth 62 and pinion 63, a long screw 67 is received in the rack 61 to apply gravitational force to engage the rack and pinion.

To protect the rack and pinion from "bottoming-out" of the rail 38, the vertical displacement of the rail is limited by a stop 68 integral with the base 13. Also, the lower arm 60 is pivoted to the rail 38 at two points 69, 70 formed on a resilient plastic bracket 71. The lower arm 60 is held on the bracket 71 by the force of a spring 72 which is clamped between the bracket 71 and the vertically moving rail 38 by a screw 73. The lower arm 60 is slotted so as to disengage the pivots 69, 70 near the respective lower and upper limits of vertical travel of the rail 38. A screw 74 abuts the lower portion of the bracket 71 and could possibly function as a full scale adjustment by bending the bracket 71 to slightly change the angle of the rack 62 with respect to the vertical direction.

In order to provide a zeroing adjustment in response to rotation of the zeroing knob 31, an upper arm 75 includes a pivot connection 76 to the stationary rail 45. To raise and lower the arm 75, the arm has a lower abutment 77 resting upon the end face of the threaded shaft 55 of a knob 31. The upper end portion of the arm 75 includes a mount 78 for a connector 79 to an extension spring 80 having its other end secured to the lower end of a mounting bracket 100 secured to the vertically moving rail 38 and leaf springs 41, 42, 43, 44.

In the Terraillon mechanism in FIG. 4, the spring 80 is selected to obtain up to about a 60° adjustment in terms of rotation of the pinon 63 which is intended to rotate a circular disc carrying a graduated scale. For the purposes of the present invention, a pointer rather than a graduated scale is carried by a disc. Also, for the present invention, it is desirable for the zeroing knob 31 to permit a full 360° rotation of the pointer. Therefore, the stiffness of the spring 80 should be increased and also the diameter of the pinion 63 could be decreased, to obtain a wider range of zero adjustment.

Figure 5:
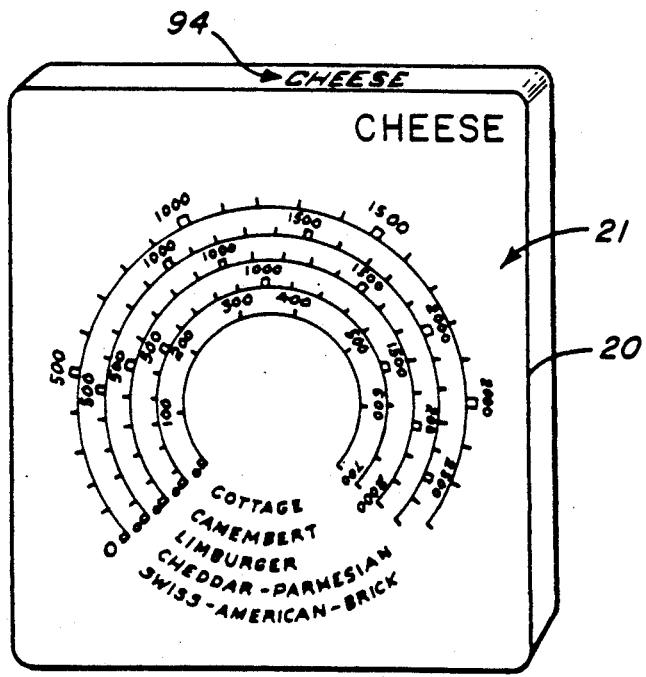
FIG. 5 is an elevation view of an illustrative slide carrying graduated scale calibrated in terms of the caloric content of various cheeses.

Turning to FIG. 5, there is shown a detailed view of the graduated scales 21 on the slide 20. These scales are in the form of concentric arcs extending over 270° so as to leave open 90° for annotating the scales with the names of food items. Specifically, the food items include eight different cheeses.

In order to design the graduated scales it is assumed that there is a fixed proportion between angular displacement and weight. For the scales shown in FIG. 5, for example, it is assumed that 180° of angular displacement corresponds to a weight of one pound. The graduations for each food item are then obtained by dividing 180 by the unit weight characteristics of the food item to obtain the angular positions of graduations. For limburger cheese, for example, one pound includes 1,565 calories according to C.F. Adams, *Encyclopedia of Food and Nutrition*, Drake Publishers, Inc., New York, New York, p. 56 (1977). The graduation for 1,000 calories of limburger cheese therefore occurs at an angular deviation of 115 degrees from the zero mark as calculated below:

$$\frac{(180°/\text{lb.}) (1000 \text{ cal.})}{1,565 \text{ cal./lb}} = 1150$$

The cheeses listed on the slide 20 should be generally arranged in terms of increasing caloric content but consideration may also be given to the fact that a number of cheeses have the same caloric content, to a high degree of precision. Cottage cheese, for example, is listed first corresponding to the graduated scale having the least circumference. Cheddar and parmesan cheese are listed together since their caloric contents differ by only one percent. Similarly, Swiss, American and brick are listed together because they have almost identical caloric contents. To prevent confusion among the scales, the scales are preferably imprinted in different colors and the names of the food items have the same colors as their associated scales.

Figure 6:
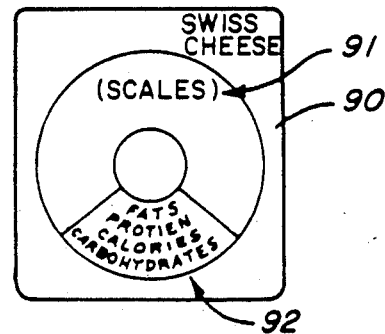
FIG. 6 is a diagram showing how a number of scales for different characteristics are arranged on a single slide for a certain food item.

The side 20 in FIG. 5 has only a single weight-related characteristic associated with each food item. As shown in FIG. 6, however, a slide 90 may have scales 91 for a number of characteristics 92 (such as calories, carbohydrates, fats, proteins, calcium, phosphorous, iron and sodium) for each food item.

Figure 7:
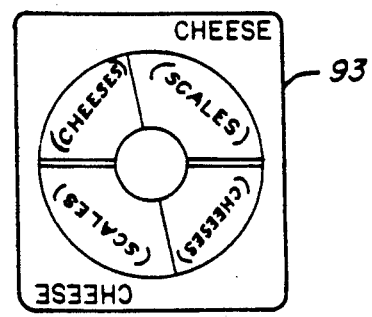
FIG. 7 is a diagrammatic view of a "double density" slide including two semicircles of different scales for different food items.

To increase the number of scales per slide, more than one scale may be provided at the same circumference for the same or different food items. In FIG. 7, a slide 93 includes a first set of food items and associated scales on the upper half and a second set of food items and associated scales on the bottom half. In this case, confusion between the upper and lower scales is prevented because the numbers and letters for the lower scales are upside-down. After the user has selected a food group, for example, the slide 93 is turned so that the desired food item is right-side up and the slide 30 is then inserted into the receiving and guiding means 22 of the weighing instrument 10. Therefore, the center of the scales is located at the center of the slide. The slide 93 also has the name of the corresponding food group printed at both the top and bottom of the slide so that the slide is never upside-down in the index file 11 (see FIG. 1).

To aid the user in finding the slide for a desired food group, the slides may also have the name 94 of the food group on the top faces of the slides, as shown in FIG. 5. In this case, the "double-density" slides 93 should have the food group printed on both the top and bottom sides, so that the top and bottom sides will be indistinguishable. The slides 20, for example, are preferably 1/10 of an inch thick. If this printing 94 is too small for a particular user, the user can flip through the index file 11 (see FIG. 1) and read the names of the food groups printed on the faces of the slides.

In view of the above, a weighing instrument having a large number of graduated scales has been described which does not require a good deal of time and effort for selecting the scales and does not cause confusion when referring to a particular scale corresponding to a desired material or weight-related characteristic. The scales are color coded and arranged in a convenient fashion on easily handled rigid rectangular slides. These slides are arranged in an index file and labelled according to subject matter for quick reference.

We claim:

1. A weighing instrument comprising a base, a platform for receiving material to be weighed and being vertically movable with respect to said base, a mechanical mechanism for rotating a shaft about an axis in response to the vertical movement of said platform with respect to said base, the angle of rotation of said shaft with respect to said base being an indication of the weight of said material, a pointer fixed to said shaft and disposed in a first plane perpendicular to said axis, and means for receiving and holding a slide in a second plane perpendicular to said axis and axially spaced from said first plane and in a predefined position with respect to said base for which said slide and said pointer are both visible and for engaging said slide only when said slide is placed in a predefined angular orientation about said axis, thereby permitting said slide to carry a scale graduated in selected units proportional to the weight of said material, and permitting said slide to be readily interchangeable with similar slides carrying scales having different graduations.

2. The weighing instrument as claimed in claim 1, wherein the slides are transparent and said pointer is visible through said slide received and held in said means for holding and receiving.

3. The weighing instrument as claimed in claim 2, wherein said pointer is carried by a circular disc concentric with said axis.

4. A weighing instrument comprising a base, a platform for receiving material to be weighed and being vertically movable with respect to said base, a mechanical mechanism for rotating a shaft about an axis in response to the vertical movement of said platform with respect to said base, the angle of rotation of said shaft with respect to said base being an indication of the weight of said material, a pointer fixed to said shaft and disposed in a first plane perpendicular to said axis, and means for receiving and holding a slide in a second plane perpendicular to said axis and axially spaced from said first plane and in a predefined position with respect to said base for which said slide and said pointer are both visible, thereby permitting said slide to carry a scale graduated in selected units proportional to the weight of said material, and permitting said slide to be readily interchangeable with similar slides carrying scales having different graduations, wherein said axis is horizontal, said first and second planes are vertical, said slide is rectangular, and said means for receiving and holding receives said slide being received from an upward position and holds said slide being held by means of gravitational force on said slide.

5. The weighing instrument as claimed in claim 4, wherein said guiding means defines an elongated rectangular slot for receiving said slide being received.

6. A weighing instrument comprising a base, a platform for receiving material to be weighed and being vertically movable with respect to said base, a mechanical mechanism for rotating a shaft about an axis in response to the vertical movement of said platform with respect to said base, the angle of rotation of said shaft with respect to said base being an indication of the weight of said material, a pointer fixed to said shaft and disposed in a first plane perpendicular to said axis, and means for receiving and holding a slide in a second plane perpendicular to said axis and axially spaced from said first plane and in a predefined position with respect to said base for which said slide and said pointer are both visible, thereby permitting said slide to carry a scale graduated in selected units proportional to the weight of said material, and permitting said slide to be readily interchangeable with similar slides carrying scales having different graduations, wherein the means for receiving and holding includes a planar transparent window behind which the pointer and said slide being held are viewed.

7. A weighing instrument comprising a base, a platform for receiving material to be weighed and being vertically movable with respect to said base, a mechanical mechanism for rotating a shaft about an axis in response to the vertical movement of said platform with respect to said base, an angle of rotation of said shaft with respect to said base being an indication of the weight of said material, a pointer fixed to said shaft and disposed in a first plane perpendicular to said axis, and means for receiving and holding a slide in a second plane perpendicular to said axis and axially spaced from said first plane and in a predefined position with respect to said base for which said slide and said pointer are both visible, thereby permitting said slide to carry a scale graduated in selected units proportional to the weight of said material, and permitting said slide to be readily interchangeable with similar slides carrying scales having different graduations, further comprising an operator adjustable zeroing knob and said mechanical mechanism includes a zeroing mechanism actuated by said zeroing knob for performing a zero adjustment to effect at least a full 360° rotation of said pointer, thereby facilitating the individual weighing and analysis of different materials by successively (1) inserting in said means for receiving and holding a slide corresponding to the material to be analyzed, (2) adjusting the zeroing knob to register the pointer with a zero indication for a scale carried by the inserted slide, and (3) placing the material to be analyzed on said platform, so that said pointer indicates on said scale units proportional to the added weight of said material.

8. A weighing instrument comprising a base, a platform for receiving material to be weighted and being vertically movable with respect to said base, a mechanical mechanism for rotating a shaft about a horizontal axis in response to the vertical movement of said platform with respect to said base, the angle of rotation of said shaft with respect to said base being an indication of the weight of said material, said angle of rotation of the shaft being indicated by a pointer pivoted about said axis for rotation in a first vertical plane perpendicular to said axis, a housing secured to said base and enclosing said mechanical mechanism, the housing defining an opening for viewing the pointer bounded by two vertical parallel and spaced side planes perpendicular to said first vertical plane, the housing including means in the side planes for engaging a planar and rectangular transparent viewing window disposed parallel to said first vertical plane in front of the pointer, and the side planes and window defining a rectangular slot for receiving from above a transparent rectangular and interchangeable slide carrying concentric scales graduated in units proportional to the weight of said material, the slide being held by the force of its own weight in a position such that the slide is parallel to the transparent window and the scales are concentric with said horizontal axis.

9. The weighing instrument as claimed in claim 8, wherein the slide being held rests upon a ledge integrally formed with said base.

10. The weighing instrument as claimed in claim 8, wherein the pointer is carried by a circular disc concentric with said axis, and said circular disc is received in a concentric circular aperture in a back plate, the back plate being disposed in spaced parallel relation with respect to said transparent window to further define the rectangular slot receiving said slide.

11. The weighing instrument as claimed in claim 10, wherein tho back plate is not integral with the housing, and is engaged between said side planes by engaging means formed in the housing.

12. The weighing instrument as claimed in claim 8, wherein the housing includes a spherical depression aligned with a semicircular indentation in the top of the transparent window to guide finger-gripping of said slide being held.

13. A set of interchangeable slides for use with a weighing instrument comprising a base, a platform for receiving material to be weighed and being vertically movable with respect to said base, a mechanical mechanism for rotating a shaft about an axis in response to the vertical movement of said platform with respect to said base, the angle of rotation of said shaft with respect to said base being an indication of the weight of said material, a pointer fixed to said shaft and disposed in a first plane with respect to said axis, and means for receiving and holding a selected slide from said set in a second plane perpendicular to said axis and axially spaced from said first plane and in a predefined position with respect to said base for which said slide and said pointer are both viewable, wherein said slide carries a number of concentric scales graduated in units proportional to the weight of said material, and said slide is transparent to permit viewing of the pointer from behind the graduated scales, and is rigid and rectangular to facilitate interchange of said slide with another slide in said set.

14. The set of interchangeable slides as claimed in claim 13, wherein the slides in said set carry annotated scales graduated in calories for various common food items in the major food groups, the scales being annotated with the names of their corresponding food items.

15. The set of interchangeable slides as claimed in claim 14, wherein the scales carried by each slide correspond to related food items from the same common food group, and wherein the slides are arranged in an index file according to said major food groups and subdivided by divider cards labelled with the names of said major food groups.

16. The set of interchangeable slides as claimed in claim 14, wherein the scales carried by each slide correspond to related food items, the slides are arranged in a horizontal stack, and a top face of each slide is labelled with a generic term for said related food items, so that the generic terms are visible without the need for unstacking the stack of slides.

17. The set of interchangeable slides as claimed in claim 14, wherein a first half of at least one of the slides in the set includes a first group of scales and annotations in a first semicircle, and the second half of the same slide includes a second group of scales and annotations in a second semicircle, so that the user may select either half of the slide for viewing right-side up when the slide is inserted into said means for receiving and holding, the other half of the slide being upside down.

18. The set of interchangeable slides as claimed in claim 14, wherein the graduated scales are of different colors and the labels are of the same colors as their corresponding scales.

19. The set of interchangeable slides as claimed in claim 13, wherein each slide in said set carries a number of scales associated with at least one food item for indicating different weight-related characteristics being selected from the set of calories, carbohydrates, fats, proteins, calcium, phosphorous, iron and sodium.

20. The set of interchangeable slides as claimed in claim 13, wherein the slides are arranged in a stack, and an edge face of each slide is labelled with a name characterizing the information content of the slide, so that the name is visible to identify the slide without the need for unstacking the stack of slides.

* * * * *